United States Patent
Grosskinsky

(10) Patent No.: US 8,594,259 B2
(45) Date of Patent: Nov. 26, 2013

(54) RECEIVING CIRCUIT, USE, AND METHOD FOR RECEIVING AN ENCODED AND MODULATED RADIO SIGNAL

(75) Inventor: Ulrich Grosskinsky, Neudenau (DE)

(73) Assignee: Atmel Corporation, San Jose, CA (US)

(*) Notice: Subject to any disclaimer, the term of this patent is extended or adjusted under 35 U.S.C. 154(b) by 875 days.

(21) Appl. No.: 12/708,675

(22) Filed: Feb. 19, 2010

(65) Prior Publication Data
US 2010/0208849 A1 Aug. 19, 2010

Related U.S. Application Data

(60) Provisional application No. 61/153,844, filed on Feb. 19, 2009.

(30) Foreign Application Priority Data
Feb. 19, 2009 (DE) .......................... 10 2009 009 565

(51) Int. Cl.
*H04B 1/10* (2006.01)
(52) U.S. Cl.
USPC ............ 375/350; 375/230; 708/300; 329/353
(58) Field of Classification Search
USPC ......... 375/230, 232, 235, 236, 340, 346, 350; 329/318–320, 346, 350, 353; 708/300, 708/313, 322, 323
See application file for complete search history.

(56) References Cited

U.S. PATENT DOCUMENTS

| | | | |
|---|---|---|---|
| 5,568,456 A * | 10/1996 | Hayashi et al. | 369/124.01 |
| 5,703,905 A * | 12/1997 | Langberg | 375/232 |
| 5,745,856 A | 4/1998 | Dent | |
| 6,359,938 B1 | 3/2002 | Keevill et al. | |
| 6,732,129 B1 * | 5/2004 | Ashjaee | 708/322 |
| 7,450,666 B2 | 11/2008 | Miyanaga et al. | |
| 2010/0027747 A1 * | 2/2010 | Mott | 378/82 |

OTHER PUBLICATIONS

File Reference No. 10 2009 009 565.9-31, issued by The German Patent and Trademark Office, Office Action dated Sep. 2, 2009, German and English translation.

* cited by examiner

*Primary Examiner* — Dac Ha
(74) *Attorney, Agent, or Firm* — Baker Botts LLP

(57) ABSTRACT

A receiving circuit, use, and method for receiving an encoded and modulated radio signal is provided. The circuit comprise a demodulator and a digital filter connected downstream of the demodulator for moving averaging. The filter has at least two FIFO registers and subtractors. Whereby for subtracting an output value of the FIFO register from an input value of the FIFO register a subtractor is connected to each FIFO register. Wherein the filter has a weighting unit, which is connected downstream of each FIFO register, and wherein the filter has an integrator, which is connected downstream of the subtractors for integration.

11 Claims, 3 Drawing Sheets

RECEIVING CIRCUIT, USE, AND METHOD FOR RECEIVING AN ENCODED AND MODULATED RADIO SIGNAL

This nonprovisional application claims priority to German Patent Application No. 10 2009 009 565.9, which was filed in Germany on Feb. 19, 2009, and to U.S. Provisional Application No. 61/153,844, which was filed on Feb. 19, 2009, and which are both herein incorporated by reference.

BACKGROUND OF THE INVENTION

1. Field of the Invention

The present invention relates to a receiving circuit, to a method for receiving an encoded and modulated radio signal, and to a use thereof.

2. Description of the Background Art

A radio system for communication of information over an air interface by means of radio is supplied in more recent applications with a battery as the energy source. Locking and access systems for motor vehicles are an example of this. It is also possible to transmit measured data by means of radio, for example, from a battery-operated weather station. An energy-saving operation enables a long operating time without replacement of the battery.

SUMMARY OF THE INVENTION

The object of the invention is to improve a receiving circuit for receiving an encoded and modulated radio signal as much as possible. Accordingly, a receiving circuit for an encoded and modulated radio signal is provided. The encoding occurs in an embodiment via a symbol code which can have two or more symbols, which can, for example, represent binary information. The symbol code is also called a line code. Examples of a line code are, for example, the Manchester code or the 1/3-2/3 code.

A radio signal can be received via an antenna. The receiving circuit has a digital demodulator for demodulating the receivable radio signal.

The receiving circuit has a digital filter, which is connected downstream of the demodulator in the receive path. The digital filter is formed for moving averaging.

The filter has at least two FIFO registers. A FIFO register (first in first out) in this respect outputs first the values that are also loaded first into the register. Preferably, the receiving circuit is formed to change the clocking of the at least two FIFO registers by means of an adjustable clock frequency. An input of the filter is connected to the demodulator. The values output by the demodulator are loaded into a FIFO register via the input of the filter.

The filter for each FIFO register has a subtractor, which is connected to the respective FIFO register for subtracting an output value of the FIFO register from an input value of the FIFO register. Preferably, the subtractor is connected to the input of the FIFO register. Preferably, the subtractor is connected to the output of the FIFO register.

The filter has a weighting unit, which is connected downstream of each FIFO register. The weighting unit is formed for weighting the difference values of the subtractors. Preferably, the weighting unit is connected to the subtractors. The weighting unit can be connected to the subtractors in different arrangements in regard to the sequence of weighting and subtraction.

The filter has an integrator, which is connected downstream of the subtractors particularly in the receive path. In this regard, it is possible that the integrator is connected to a subtractor and/or the weighting unit. The integrator is connected to integrate the values output by the subtractors and weighted by the weighting unit. The integrator is connected downstream of, for example, the subtractors, when additional computational operations or storage of values occur between an output of a subtractor and an input of the integrator.

The object of the invention further is to provide as improved a receiving method as possible. Accordingly, a method is provided for receiving an encoded and modulated radio signal. In the method, the radio signal is demodulated by a digital demodulator. A moving average of the demodulated radio signal is formed by a digital filter. In so doing, the moving average is formed in that the demodulated radio signal is loaded into at least two FIFO registers, in that in each case output values of the FIFO register are subtracted from the input values of the FIFO register, and in that the differences formed by the subtraction are weighted and integrated by an integrator.

The invention furthermore has as its object to provide a use. Accordingly, a use is provided of at least two FIFO registers, in each case of a subtractor connected to an input and an output of a FIFO register of a weighting unit, which is connected downstream of each FIFO register, and of an integrator connected downstream of the subtractors for moving averaging of a demodulated radio signal.

The embodiments described hereinafter relate to the receiving circuit, as well as to the use and to the method for receiving an encoded and modulated radio signal. Here, the methods features also emerge from the functions of the receiving circuit.

According to an embodiment, it is provided that the filter has an assigned FIFO register for each symbol of a fixed coding instruction of the radio signal. Preferably, in this case, the length of the FIFO register corresponds to the number of samplings assigned to the symbol length.

An input of a first register of the at least two FIFO registers can be connected to the demodulator. An output of the first FIFO register can be connected to an input of a second register of the at least two FIFO registers. Furthermore, a series connection of at least two FIFO registers can be provided.

According to an embodiment, the weighting unit can have a computing circuit for weighting. The computing circuit advantageously has a number of subtractors and/or adders.

The weighting of the individual symbols can be predefined by the coding instruction. The Manchester code is used advantageously as the coding instruction. The Manchester code has two symbols. One of the symbols is assigned the weight +1, and the other symbol is assigned the weight −1.

In an embodiment, it is provided that a FIFO register length of each FIFO register is variable. Preferably, the FIFO register length is adjustable. Switches can be provided that are interconnected for changing the FIFO register length. The receiving circuit for changing the FIFO register length can have a multiplexer, connected to the taps of the FIFO register, for each of the at least two FIFO registers.

It is provided in an embodiment that the filter can have a sampling rate converter. The sampling rate converter can be formed for decimation or interpolation. The sampling rate converter can be connected downstream, of the weighting unit and/or connected upstream of the integrator.

In an embodiment, it is provided that a clock regeneration unit, particularly with a phase-locked loop for regenerating a clock from the radio signal, can be connected downstream of the filter. The input of the clock regeneration unit can be switched by switches between subcircuits of the filter with different filter characteristics. Further, a decision making unit for providing transmitted data can be connected downstream of the filter.

According to an embodiment, an input of a clock regeneration unit can be connected to the switches. The input of the clock regeneration unit can be connected by means of the switches optionally to an output of the integrator or an output of an additional integrator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A coding instruction with a number of predefined symbols for each bit is used for coding of radio signals to be transmitted. The code in this case may also contain the clock signal. In FIG. 3b, a Manchester coding is shown as a line code. In the Manchester code, a bit sequence of zeros and ones modulates in a binary manner the phase position of a clock signal. There is one edge per bit. In the exemplary embodiment of FIG. 3b, a falling edge is provided for the bit value "0" and a rising edge for the bit value "1." The two symbols per bit therefore have a different amplitude A. For the bit value "0," the first symbol has an H level and the second subsequent symbol an L level. For the bit value "1," the first symbol has an L level and the second subsequent symbol an H level. The symbol time $t_s$ is typically half the bit time $t_B$.

Figure 4A:
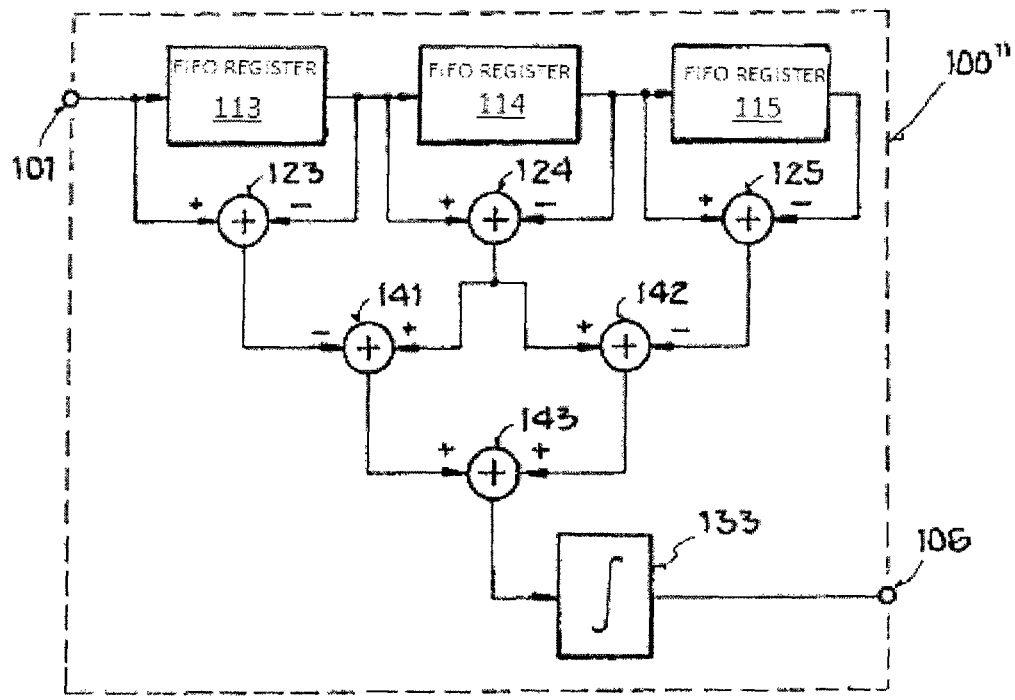
FIG. 4a shows another exemplary embodiment with a filter for moving averaging.
Figure 4B:
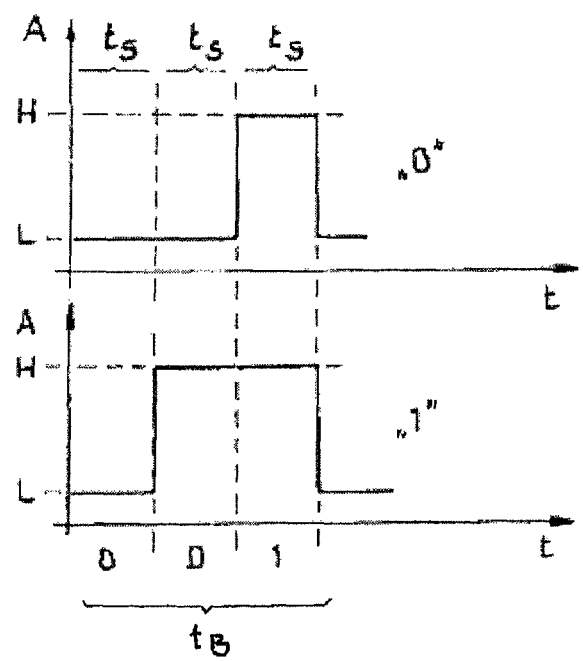
FIG. 4b shows a 1/3-2/3 coding.

An alternative to the Manchester coding—a 1/3-2/3 coding—is shown in FIG. 4b. Three symbols 0, D, and 1 each with a symbol time of $t_s$ together form a bit, therefore a one "1" in the lower half of the diagram and a zero "0" in the upper half of the diagram. The first symbol 0 here always has an L level and the third and last symbol 1 always an H level. The second data symbol D in the middle contains the data bit zero or one to be transmitted.

Figure 1:
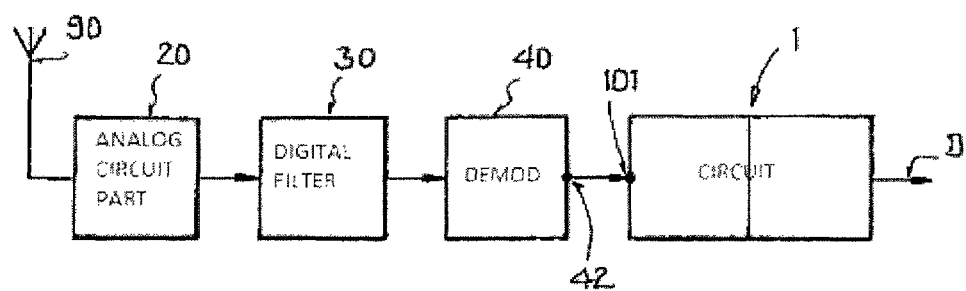
FIG. 1 shows a schematic block diagram of a receiving circuit.

For the digital decoding of encoded radio signals, a receive signal with a higher frequency than a symbol frequency is sampled. A number of sampling values are provided for each symbol. The bits of the transmitted data are determined from the sampling values with a bit width of, for example, 8 bits. A very simplified example of a receiving circuit is shown in FIG. 1. A radio signal is received with antenna 90. Amplification, mixing, filtering, and analog-to-digital conversion can occur in an analog circuit part 20. The digital signal in the receive path via a digital filter 30 and a demodulator 40 reaches an input 101, connected to output 42 of demodulator 40, of a circuit 1, connected downstream in the receive path, with a filter for moving averaging and a decision making unit. The data D are output at the output of circuit 1.

Figure 2:
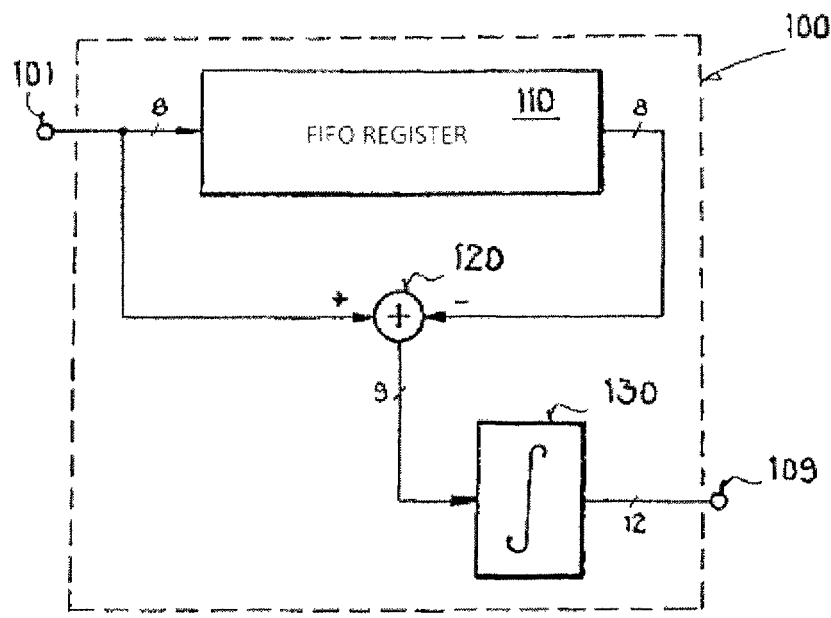
FIG. 2 shows a filter for moving averaging.

A digital filter 100 for moving averaging (moving average filter), which could be used in circuit 1, is shown in FIG. 2. Filter 100 has a FIFO register 110 (FIFO=first in first out) connected to its input 101. The length of FIFO register 110 in this regard corresponds to the number of samplings per symbol, so that all samplings of a symbol are loaded within a symbol time $t_s$ one after another into FIFO register 110. The samplings loaded into the FIFO register in so doing need not necessarily correspond to the samplings of an analog-to-digital converter; a rate increase or rate reduction can also be previously provided.

To enable moving averaging for different sampling rates, the length of FIFO register 110 is variable. For example, the length of FIFO register 110 can be adjusted by switching means, such as, for example, a semiconductor switch or a gate logic. Especially advantageously, to adjust the length of FIFO register 110, taps of FIFO register 110 are switched by a multiplexer of filter 100 to an output. FIFO register 110 is preset in an initialization with zeros, before the first value is loaded into FIFO register 110.

Filter 100 in addition has a subtractor 120, which is connected to an input and an output of FIFO register 110. In this regard, subtractor 120 is connected for subtracting an output value of FIFO register 110 from an input value of FIFO register 110. Filter 100 has an integrator 130, which is connected to the output of subtractor 120. The 9-bit output values of subtractor 120 are integrated by integrator 130 and a 12-bit integration value is output at output 109.

Figure 3A:
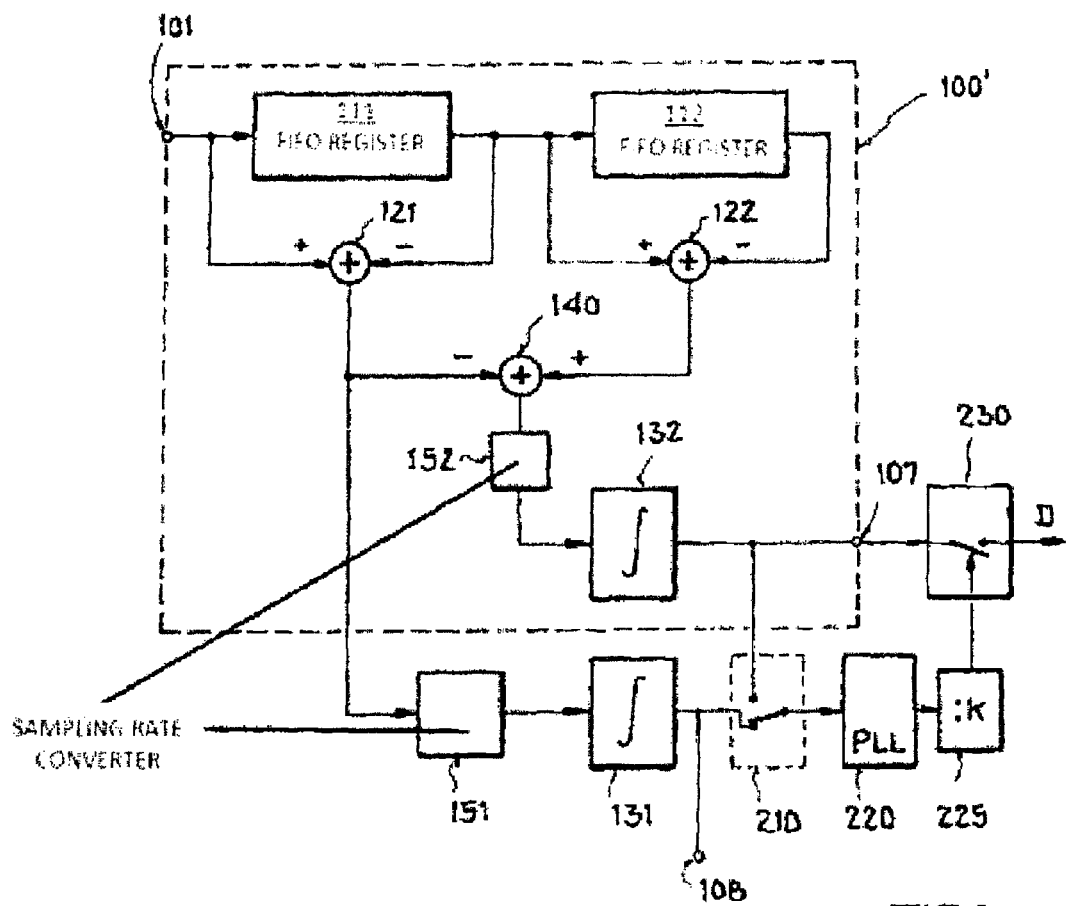
FIG. 3a shows an exemplary embodiment with a filter for moving averaging.
Figure 3B:
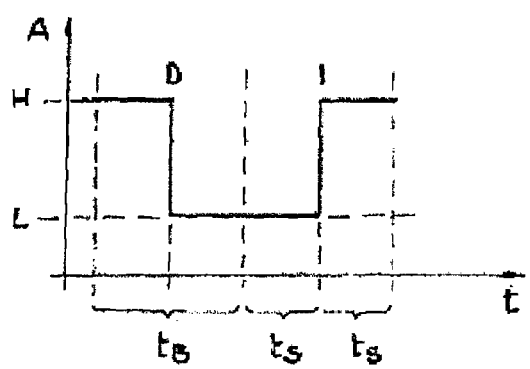
FIG. 3b shows a Manchester coding.

FIG. 3a shows an additional exemplary embodiment with a filter 100' for moving averaging. Filter 100' has a FIFO register 111, connected to its input 101, and a first subtractor 121. Further, filter 100' of the exemplary embodiment of FIG. 3a has a second FIFO register 112 and a second subtractor 122. A first integrator 132 of filter 100' is connected downstream of first subtractor 121 and second subtractor 122. A weighting unit 140 in the form of a subtractor 140 is connected between subtractors 121, 122 and first integrator 132. Alternatively, weighting unit 140 could also be connected upstream of one of the subtractors 121 or 122. As an alternative to FIG. 3a, it is also possible to connect two integrators before the inputs of weighting unit 140. Both alternative embodiments are not shown in FIG. 3a.

The length of each FIFO register 111 and 112 in FIG. 3a in this regard corresponds to the number of samplings per symbol, so that all samplings of a symbol are loaded into FIFO register 111 or 112 within a symbol time $t_s$. To enable moving averaging for different sampling rates, the length of both FIFO registers 111 and 112 is variable, for example, adjustable by switching means, such as a multiplexer connected to intermediate taps of the respective FIFO register 111, 112.

A sampling rate converter 152 is connected between weighting unit 140 and integrator 132. An increase or decrease in the sampling rate is possible by means of sampling rate converter 152. Sampling rate converter 152 enables an interpolation or decimation of the sampling values.

Filter 100' of the exemplary embodiment of FIG. 3a in this case is assigned to a Manchester coding, as shown in FIG. 3b. In this regard, first FIFO register 111 is assigned to a first symbol of the coding, therefore to the first bit half, and second FIFO register 112 is assigned to a second symbol of the coding, therefore to the second bit half. Weighting by weighting unit 140 is predefined by the coding instruction of the Manchester code. The output of first subtractor 121 is weighted by weighting unit 140 with −1 and the output of second subtractor 122 is weighted by weighting unit 140 with +1.

The function of a correlation filter is effected by weighting unit 140. The effect is achieved in this way that interferences are filtered out not only by the moving averaging by filter 100'. The effect is achieved in addition that at the same time all symbols are evaluated according to the coding instruction of a transmitted bit and therefore the (moving) average of all symbols can be evaluated together, so that interferences within a symbol can be more easily eliminated. In the exemplary embodiment of FIG. 3a, the Manchester code has two symbols, whereby the output values of subtractors 121, 122 for both symbols can be subtracted from one another by subtractor 140 as weighting unit 140. Moreover, the effect is achieved by the exemplary embodiment of FIG. 3a that no additional determination of a decision threshold is required to decide whether this is a logic zero or a logic one in the received data bit. The decision threshold is zero for the exemplary embodiment of FIG. 3a, so that advantageously the evaluation of the sign is sufficient.

An integration value of integrator 132 is compared with a threshold (zero) of a decision making unit (not shown in FIG. 3a) for determining the data bit D. It is immaterial whether the integration (by two integrators) occurs before the weighting by weighting unit 140 or occurs after the weighting by weighting unit 140 as in the exemplary embodiment of FIG. 3a (by integrator 132). Only the required bit width of weighting unit 140 is different. The effect is achieved in addition by the exemplary embodiment of FIG. 3a that the zero crossings of the integration value are formed more steeply, so that a lower phase noise can be achieved during the zero crossing detection.

In addition, in FIG. 3a an additional sampling rate converter 151 and an additional integrator 131, connected solely to the output of the first subtractor 121 for integration of output values, are provided. Said additional integrator 131 is formed for clock regeneration from the individual symbols of the receive signal. Output 108 is connected to the output of additional integrator 131. A signal can be removed at said output 108 analogous to that at output 109 (according to the exemplary embodiment of FIG. 2), which provides values based on the individual symbols.

Further, the exemplary embodiment of FIG. 3a shows two switching means 210 and 230, a clock regeneration unit 220, for example, with a phase-locked loop (PLL), and a divider 225 for dividing by the division factor K. The phase-locked loop is connected for data clock regeneration. The parameters in the loop of the phase-locked loop in this regard are matched to the sampling rate and symbol length. The inertia of the phase-locked loop enables the generation of a clock also in the case of a disrupted signal.

The input of clock regeneration unit 220 is connected to a changeover switch 210 and via changeover switch 210 is connected to the output of first integrator 132 and the output of additional integrator 131. The regenerated clock, which is divided by divider 225, is output at the output of clock regeneration unit 220. The divided clock controls sampler 230 to obtain the data D.

During reception of a preamble, a start sequence with a uniform signal sequence, such as 010101 or 100100, without useful information (exclusively zeros or exclusively ones), clock regeneration unit 220 is connected by means of changeover switch 210 to integrator 132. As a result, the effect is achieved that clock regeneration unit 220 during the transmission of the preamble is settled more precisely and less sensitive to interferences due to its implicit filter function. In contrast, the output of the additional integrator is not offset-free, so that this signal during the preamble is at first less suitable for clock regeneration.

After the transmission of the preamble, the signal at the output of additional integrator 131 and therefore at output 108 has settled, however, and can be used for clock regeneration. In contrast, information is transmitted after the preamble, so that the output signal at the output of integrator 132 changes depending on the transmitted bit values. The signal at the output of integrator 132 is then less suitable for clock regeneration, because the zero crossings can be rather flat and optionally displaced in time, so that a correction is necessary. In contrast, the symbol-dependent signal at the output of the additional integrator 131 has steeper zero crossings and because of the symbol dependence, only a small time offset. As a result of the switching possibility by means of switching means 210, the particular advantage is effected that an ad hoc data transmission with useful information can be received as soon as after two or three bits.

Another exemplary embodiment of a filter 100" for moving averaging is shown in FIG. 4a. Filter 100" in this case is assigned to a 1/3-2/3 coding instruction according to FIG. 4b. The 1/3-2/3 coding instruction has three symbols. In this case, each symbol is assigned a FIFO register 113, 114, and 115 with associated subtractor 123, 124, 125. Furthermore, a weighting unit with the two subtractors 141, 142 and the adder 143 is provided, which weights the output values of subtractors 123, 124, 125. In this case, values assigned to the first and third subtractor 123, 125 are weighted with −1 and the value assigned to the second (middle) subtractor 124 with 2.

Integrator 133 connected downstream of subtractors 123, 124, and 125 integrates the weighted values for moving averaging. Integrator 133 could be replaced with functional equivalence by three integrators (not shown) which are connected between subtractors 123, 124, 125 and the weighting unit. The effect is achieved that interferences are effectively suppressed by filter 100" of exemplary embodiment of FIG. 4a.

Sampling rate converter 151, 152, the additional integrator 131, the switching means 210, clock regeneration unit 220, divider 225, and switching means 230 can be provided in addition for filter 100" of FIG. 4a for clock regeneration according to FIG. 3a. In this case, sampling rate converter 151 would be connected to subtractor 123 and switching means 210, 230 at the output of integrator 133.

The invention is not limited to the shown embodiment variants of FIGS. 1 through 4b. For example, it is possible to use a different coding instruction with a different number of symbols. It is also possible to replace the connections of the filter by connection of mathematical equivalents. The functionality of the circuit according to FIG. 1 can be used especially advantageously for a radio network of a motor vehicle, for example, for tire pressure monitoring.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving circuit for an encoded and modulated radio signal, the receiving circuit comprising:
   a demodulator; and
   a digital filter connectable downstream of the demodulator, the digital filter having at least two FIFO registers, subtractors, and a weighting unit and an integrator configured to determine a moving average, wherein for subtracting an output value of the FIFO register from an input value of the FIFO register a subtractor is connectable to each FIFO register, wherein the weighting unit is connectable downstream of each FIFO register, and wherein the integrator is connectable downstream of the subtractors for integration; and wherein the digital filter has an assigned FIFO register for each symbol of a fixed coding instruction.

2. The receiving circuit according to claim 1, wherein an input of a first FIFO register of the at least two FIFO registers is connectable to the demodulator or joined directly therewith, and/or Wherein an output of a first FIFO register is connectable or joined directly with an input of a second FIFO register of the at least two FIFO registers.

3. The receiving circuit according to claim 1, wherein the weighting unit has a computing circuit for weighting a number of subtractors and/or adders.

4. The receiving circuit according to claim wherein the weighting of the individual symbols is predefined by the coding instruction.

5. The receiving circuit according to claim 1, wherein a FIFO register length of each FIFO register is variable.

6. The receiving circuit according to claim 1, wherein a clock regeneration unit with a phase-locked loop for regenerating a clock from the radio signal is connectable downstream of the filter.

7. The receiving circuit according to claim 1, wherein a decision making unit for providing transmitted data is connectable downstream of the filter.

8. A receiving circuit for an encoded and modulated radio signal, the receiving circuit comprising:
a demodulator; and
a digital filter connectable downstream of the demodulator, the digital filter having at least two FIFO registers, subtractors, and a weighting unit and an integrator configured to determine a moving average,
wherein for subtracting an output value of the FIFO register from an input value of the FIFO register a subtractor is connectable to each FIFO register,
wherein the weighting unit is connectable downstream of each FIFO register,
wherein the integrator is connectable downstream of the subtractors for integration, and
wherein the digital filter has a sampling rate converter connectable at one or more of downstream of the weighting unit and upstream of the integrator.

9. A receiving circuit for an encoded and modulated radio signal, the receiving circuit comprising:
a demodulator; and
a digital filter connectable downstream of the demodulator, the digital filter having at least two FIFO registers, subtractors, and a weighting unit and an integrator configured to determine a moving average,
wherein for subtracting an output value of the FIFO register from an input value of the FIFO register a subtractor is connectable to each FIFO register,
wherein the weighting unit is connectable downstream of each FIFO register,
wherein the integrator is connectable downstream of the subtractors for integration; and
further comprising a clock regeneration unit, wherein an input of the clock regeneration unit is connectable to a switch, and wherein the switch is connectable to an output of the integrator or to an output of an additional integrator.

10. A method for receiving an encoded and modulated radio signal, the method comprising:
demodulating the radio signal by a digital demodulator;
providing a moving average of the demodulated radio signal by a digital filter;
providing the demodulated radio signal into at least two FIFO registers, wherein the digital filter has an assigned FIFO register for each symbol of a fixed coding instruction;
subtracting, in each case, output values of each of the FIFO register from input values of each of the FIFO register;
weighting and integrating differences formed by the subtraction.

11. A method comprising using at least two FIFO registers, in each case of a subtractor connected to an input and an output of a FIFO register of a weighting unit, which is connected downstream of each FIFO register, and of an integrator connected downstream of the subtractors for moving averaging of a demodulated radio signal, wherein the digital filter has an assigned FIFO register for each symbol of a fixed coding instruction.

* * * * *

UNITED STATES PATENT AND TRADEMARK OFFICE
CERTIFICATE OF CORRECTION

PATENT NO.        : 8,594,259 B2                                     Page 1 of 1
APPLICATION NO.   : 12/708675
DATED             : November 26, 2013
INVENTOR(S)       : Ulrich Grosskinsky It is certified that error appears in the above-identified patent and that said Letters Patent is hereby corrected as shown below:

In the Claims

Col. 7, Ln. 15: After "and/or" and before "an" delete "Wherein" and insert --wherein--.

Col. 7, Ln. 21: After "claim" and before "wherein" insert --1,--.

Signed and Sealed this
Fourteenth Day of October, 2014

Michelle K. Lee
*Deputy Director of the United States Patent and Trademark Office*